(12) United States Patent
Yonezawa et al.

(10) Patent No.: US 11,557,409 B2
(45) Date of Patent: Jan. 17, 2023

(54) THERMISTOR AND METHOD FOR MANUFACTURING THERMISTOR

(71) Applicant: MITSUBISHI MATERIALS CORPORATION, Tokyo (JP)

(72) Inventors: Takehiro Yonezawa, Naka (JP); Satoko Higano, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 4 days.

(21) Appl. No.: 17/267,814

(22) PCT Filed: Aug. 21, 2019

(86) PCT No.: PCT/JP2019/032629
§ 371 (c)(1),
(2) Date: Feb. 11, 2021

(87) PCT Pub. No.: WO2020/040193
PCT Pub. Date: Feb. 27, 2020

(65) Prior Publication Data
US 2021/0166845 A1 Jun. 3, 2021

(30) Foreign Application Priority Data

Aug. 23, 2018 (JP) .............................. JP2018-156647
Aug. 5, 2019 (JP) .............................. JP2019-143817
Aug. 5, 2019 (JP) .............................. JP2019-143890

(51) Int. Cl.
*H01C 7/00* (2006.01)
*H01C 17/28* (2006.01)
(Continued)

(52) U.S. Cl.
CPC ............... *H01C 7/008* (2013.01); *H01C 1/14* (2013.01); *H01C 1/142* (2013.01); *H01C 17/06526* (2013.01); *H01C 17/281* (2013.01)

(58) Field of Classification Search
CPC .......... H01C 7/008; H01C 1/14; H01C 1/142; H01C 17/06526; H01C 17/281
See application file for complete search history.

(56) References Cited

U.S. PATENT DOCUMENTS 5,750,264 A * 5/1998 Ueno .................. H01C 1/142
428/688
6,535,105 B2 * 3/2003 Heistand, II ............ H01G 2/12
338/307
(Continued)

FOREIGN PATENT DOCUMENTS

CN  1421388 A  6/2003
JP  S62-020276 A  1/1987
(Continued)

OTHER PUBLICATIONS

JP2014053551, Kajino et al., machine translation. (Year: 2014).*
(Continued)

*Primary Examiner* — Kyung S Lee
(74) *Attorney, Agent, or Firm* — Locke Lord LLP; James E. Armstrong, IV; Nicholas J. DiCeglie, Jr.

(57) ABSTRACT

A thermistor includes a thermistor element, a protective film formed on the surface of the thermistor element, and electrode portions formed on both end portions of the thermistor element, in which the protective film is formed of silicon oxide, and, as a result of observing a bonding interface between the thermistor element and the protective film, a ratio $L/L_0$ of a length $L$ of an observed peeled portion to a length $L_0$ of the bonding interface in an observation field is 0.16 or less.

7 Claims, 4 Drawing Sheets

(51) Int. Cl.
*H01C 1/14* (2006.01)
*H01C 1/142* (2006.01)
*H01C 17/065* (2006.01)

(56) References Cited

U.S. PATENT DOCUMENTS

| | | | |
|---|---|---|---|
| 6,545,857 B2* | 4/2003 | Kishimoto | H01G 2/12 |
| | | | 29/25.42 |
| 6,791,163 B2 | 9/2004 | Kishimoto et al. | |
| 8,179,225 B2 | 5/2012 | Iguchi et al. | |
| 8,339,237 B2 | 12/2012 | Kajino et al. | |
| 9,865,397 B2 | 1/2018 | Tanaka et al. | |
| 2002/0027764 A1 | 3/2002 | Kishimoto et al. | |
| 2004/0048052 A1* | 3/2004 | Kishimoto | C04B 35/4682 |
| | | | 428/209 |
| 2009/0098710 A1 | 4/2009 | Yamazaki | |
| 2016/0024346 A1* | 1/2016 | Inoue | H01G 4/224 |
| | | | 336/200 |
| 2017/0225433 A1* | 8/2017 | Okuyama | C03C 17/32 |

FOREIGN PATENT DOCUMENTS

| | | |
|---|---|---|
| JP | S62-053850 A | 3/1987 |
| JP | H03-240202 A | 10/1991 |
| JP | H03-250603 A | 11/1991 |
| JP | H08-236306 A | 9/1996 |
| JP | 2002-043167 A | 2/2002 |
| JP | 2003-077706 A | 3/2003 |
| JP | 2004-022404 A | 1/2004 |
| JP | 2004-128488 A | 4/2004 |
| JP | 2005-005412 A | 1/2005 |
| JP | 2014-053551 A | 3/2014 |
| JP | 2017-147336 A | 8/2017 |

OTHER PUBLICATIONS

JP2017147336, Kunishi et al., machine translation. (Year: 2017).*
Qiang Liangsheng, "Preparation and Characterization of Novel Functional Materials", Harbin Institute of Technology Press, Jun. 30, 2017, pp. X 180-182. (cited in the Nov. 18, 2021 Office Action issued for CN201980054442.5, See English translation of the CN OA for concise explanation).
Office Action dated Nov. 18, 2021, issued for Chinese Patent Application No. 201980054442.5 and English translation of the Search Report.
International Search Report dated Nov. 12, 2019, issued for PCT/JP2019/032629 and English translation thereof.
International Search Report dated Nov. 12, 2019, issued for PCT/JP2019/032636 and English translation thereof.
Office Action issued in U.S. Appl. No. 17/267,818, dated Mar. 3, 2022.

* cited by examiner

THERMISTOR AND METHOD FOR MANUFACTURING THERMISTOR

CROSS REFERENCE TO RELATED APPLICATIONS

This application is related to co-pending application: "THERMISTOR WITH PROTECTIVE FILM AND MANUFACTURING METHOD THEREOF" filed even date herewith in the names of Takehiro YONEZAWA and Miki ADACHI as a national phase entry of PCT/JP2019/032636; which application is assigned to the assignee of the present application and incorporated by reference herein.

TECHNICAL FIELD

This invention relates to a thermistor in which a protective film is formed on a surface of a thermistor element, and a method for manufacturing a thermistor. Priority is claimed on Japanese Patent Application No. 2018-156647, filed in Japan on Aug. 23, 2018, Japanese Patent Application No. 2019-143817, filed in Japan on Aug. 5, 2019, and Japanese Patent Application No. 2019-143890 filed in Japan on Aug. 5, 2019, the contents of which are incorporated herein by reference.

BACKGROUND ART

The thermistor described above has a characteristic by which the electrical resistance thereof changes according to the temperature and is applied in the temperature compensation of various electronic devices, in temperature sensors, and the like. In particular, recently, chip-type thermistors mounted on circuit boards have been widely used.

The thermistor described above has a structure formed of a thermistor element and a pair of electrode portions at both ends of the thermistor element.

The thermistor element has characteristics of being weak against acids and alkalis and being easily reduced. When the composition thereof changes, there is a concern that the characteristics thereof may change. For this reason, for example, as shown in Patent Document 1 and 2, a technique for forming a protective film on the surface of the thermistor element was proposed.

There is a demand for the protective film to have resistance to a plating solution, environmental resistance, insulation, and the like, in order to suppress deterioration of the thermistor element during subsequent steps and use.

Here, in Patent Document 1 and 2, a protective film formed of glass is formed by coating a glass paste on the surface of the thermistor element and firing the glass paste.

In addition, a method for forming a protective film formed of $SiO_2$ on the surface of the thermistor element by a sputtering method has also been proposed.

In a case where a protective film is formed on the surface of the thermistor element, electrode portions are formed at both ends of the thermistor element on which the protective film is formed. Here, the electrode portions are formed by coating, for example, a metal paste on both ends of the thermistor element and firing the metal paste. For this reason, the thermistor element on which the protective film is formed is heated to, for example, 700° C. or higher.

CITATION LIST

Patent Document

[Patent Document 1]
  Japanese Unexamined Patent Application, First Publication No. H03-250603
[Patent Document 2]
  Japanese Unexamined Patent Application, First Publication No. 2003-077706

SUMMARY OF INVENTION

Technical Problem

Here, as shown in Patent Document 1 and 2, in the method of coating the glass paste and firing the glass paste, it was not possible to stably coat the glass paste on a small thermistor element and there was a concern that it may not be possible to form the protective film with a sufficient thickness. In addition, mass production is difficult due to erosion of the thermistor element due to penetration of the plating solution from pinholes, warpage of the thermistor element due to the uneven film thickness of the glass film (protective film), and yield deterioration due to damage in the printing step.

In addition, in a case where a protective film formed of $SiO_2$ is formed by a sputtering method, a Si target is used and the film is formed by reactive sputtering, thus, it is not possible to form the film according to a stoichiometric ratio and the film becomes weakly reduced, such as $SiO_{2-X}$. By doing so, during heating when forming the electrode portion in the subsequent step, oxygen in the thermistor element is taken away by the silicon oxide film in a weakly reduced state, such that there is a concern that partial peeling may occur between the thermistor element and the protective film or that composition unevenness may be formed.

In a case where the thermistor element and the protective film are partially peeled off, there is a concern that the adhesion of the protective film may be decreased, the protective film may be peeled off in the subsequent plating step or the like, the plating solution may erode the thermistor element, and the characteristics may be changed.

In addition, in a case where reduction or composition unevenness occurs, there is a concern that the resistance of the protective film may become insufficient and the characteristics of the thermistor element may change.

This invention was made in view of the circumstances described above and has an object of providing a thermistor which has excellent adhesion between a thermistor element and a protective film, which is able to suppress changes in the characteristics of the thermistor element during manufacturing and use, and which is able to be stably used, and a method for manufacturing the thermistor.

Solution to Problem

In order to solve the problems described above, the thermistor of the present invention is a thermistor including a thermistor element, a protective film formed on a surface of the thermistor element, and electrode portions formed on both end portions of the thermistor element, in which the protective film is formed of silicon oxide, and, as a result of observing a bonding interface between the thermistor element and the protective film, a ratio $L/L_0$ of a length L of an observed peeled portion to a length $L_0$ of the bonding interface in an observation field is 0.16 or less.

According to the thermistor of the present invention, the protective film formed of silicon oxide is formed on the surface of the thermistor element, and, as a result of observing the bonding interface between the thermistor element and the protective film, the ratio $L/L_0$ of the length L of the observed peeled portion to the length $L_0$ of the bonding interface in the observation field is 0.16 or less, thus, it is possible to suppress a decrease in the adhesion of the protective film and to suppress changes in the characteristics of the thermistor element in subsequent steps.

In addition, since the protective film is formed of silicon oxide, the resistance to a plating solution, environmental resistance, and insulation are excellent and it is possible to suppress deterioration of the thermistor element.

Here, in the thermistor of the present invention, preferably, a film thickness of the protective film is in a range of 50 nm or more and 1000 nm or less.

In such a case, since the film thickness of the protective film is 50 nm or more, it is possible to reliably suppress deterioration of the thermistor element. On the other hand, since the film thickness of the protective film is 1000 nm or less, it is possible to suppress the occurrence of cracks or the like in the protective film and to sufficiently protect the thermistor element.

The method for manufacturing a thermistor of the present invention is a method for manufacturing a thermistor provided with a thermistor element, a protective film formed on a surface of the thermistor element, and electrode portions formed on both end portions of the thermistor element, the method including a protective film-forming step of forming the protective film by immersing the thermistor element in a reaction solution including silicon alkoxide, water, an organic solvent, and an alkali, and causing a silicon oxide to precipitate on the surface of the thermistor element by a hydrolysis reaction and polycondensation reaction of the silicon alkoxide.

According to the method for manufacturing the thermistor of the present invention, the protective film-forming step is provided for forming the protective film by immersing the thermistor element in the reaction solution containing the silicon alkoxide, the water, the organic solvent, and the alkali, and causing the silicon oxide to precipitate on the surface of the thermistor element by the hydrolysis reaction and polycondensation reaction of the silicon alkoxide in the reaction solution and this reaction precipitates silicon oxide by polymerizing a hydrolysate of silicon alkoxide with the terminal oxygen or hydroxyl group on the surface of the thermistor element as the starting point, thus, the adhesion between the thermistor element and the protective film is excellent. In addition, since silicon oxide is precipitated from the surface of the thermistor element, the coverage of corners and irregular portions is excellent. Thus, it is possible to manufacture the thermistor which is able to be stably used without deterioration of the characteristics of the thermistor element.

Here, the method for manufacturing the thermistor of the present invention preferably includes an electrode portion-forming step of forming the electrode portions by coating a metal paste on both end surfaces of the thermistor element and firing the metal paste, after the protective film-forming step.

In such a case, even in a case where the metal paste is heated to carry out firing in the electrode portion-forming step, it is possible to further suppress partial peeling between the thermistor element and the protective film.

In addition, in the method for manufacturing the thermistor of the present invention, the alkali may include an alkali metal compound.

By including the alkali metal compound in the reaction solution, the alkali metal is unevenly distributed at the interface between the thermistor element and the protective film of the obtained thermistor, making it possible to further increase the adhesion between the thermistor element and the protective film.

Advantageous Effects of Invention

According to the present invention, it is possible to provide a thermistor which has excellent adhesion between a thermistor element and a protective film, which is able to suppress changes in the characteristics of the thermistor element during manufacturing and use, and which is able to be stably used, and a method for manufacturing the thermistor.

DESCRIPTION OF EMBODIMENTS

A description will be given below of embodiments of the present invention with reference to the attached drawings. Here, each of the embodiments shown below is specifically described in order to better understand the gist of the invention and does not limit the present invention unless otherwise specified. In addition, in the drawings used in the following description, in order to make the characteristics of the present invention easy to understand, for convenience, the main parts may be shown after being enlarged and the dimensional ratios of the respective components may not always be the same as in practice.

Figure 1:
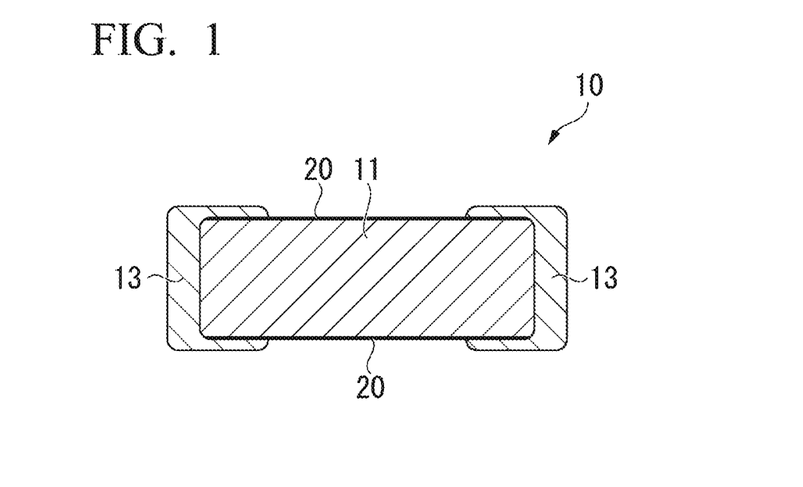
FIG. 1 is a schematic cross-sectional explanatory view of a thermistor according to an embodiment of the present invention.

As shown in FIG. 1, a thermistor 10 according to the present embodiment is provided with a thermistor element 11, a protective film 20 formed on the surface of the thermistor element 11, and electrode portions 13 formed on both end portions of the thermistor element 11.

Here, as shown in FIG. 1, the protective film 20 is not formed on both end surfaces of the thermistor element 11 and the electrode portion 13 is formed to be in direct contact with the thermistor element 11.

The electrode portion 13 is formed of a fired metal body having excellent conductivity such as Ag, for example. In addition, in the electrode portion 13, a plating film such as Ni and/or Sn may be formed on the fired body described above.

As shown in FIG. 1, the thermistor 10 has, for example, a prismatic shape. Here, the size of the thermistor 10 is not particularly limited. Since the protective film-forming technique of the present invention exhibits more effectiveness when a film is formed on a small substrate in comparison with the protective film techniques of the related art, the length of the thermistor 10 is preferably 2 mm or less, and more preferably 1 mm or less, within the realization range. The upper limit of the cross-sectional area of the cross-section orthogonal to the length direction of the thermistor 10 is preferably 0.65 mm$^2$ or less, and more preferably 0.25 mm$^2$ or less, within the realization range.

In addition, the thermistor element 11 has a characteristic by which the electrical resistance changes according to the temperature. The thermistor element 11 has a low resistance to acids and alkalis and there is a concern that the composition may change due to a reduction reaction or the like and that the characteristics thereof may change significantly. Thus, in the present embodiment, the protective film 20 for protecting the thermistor element 11 is formed.

Here, there is a demand for the protective film 20 to have resistance to a plating solution, environmental resistance, and insulation. In the present embodiment, the protective film 20 is formed of silicon oxide, specifically, $SiO_2$.

Figure 2:
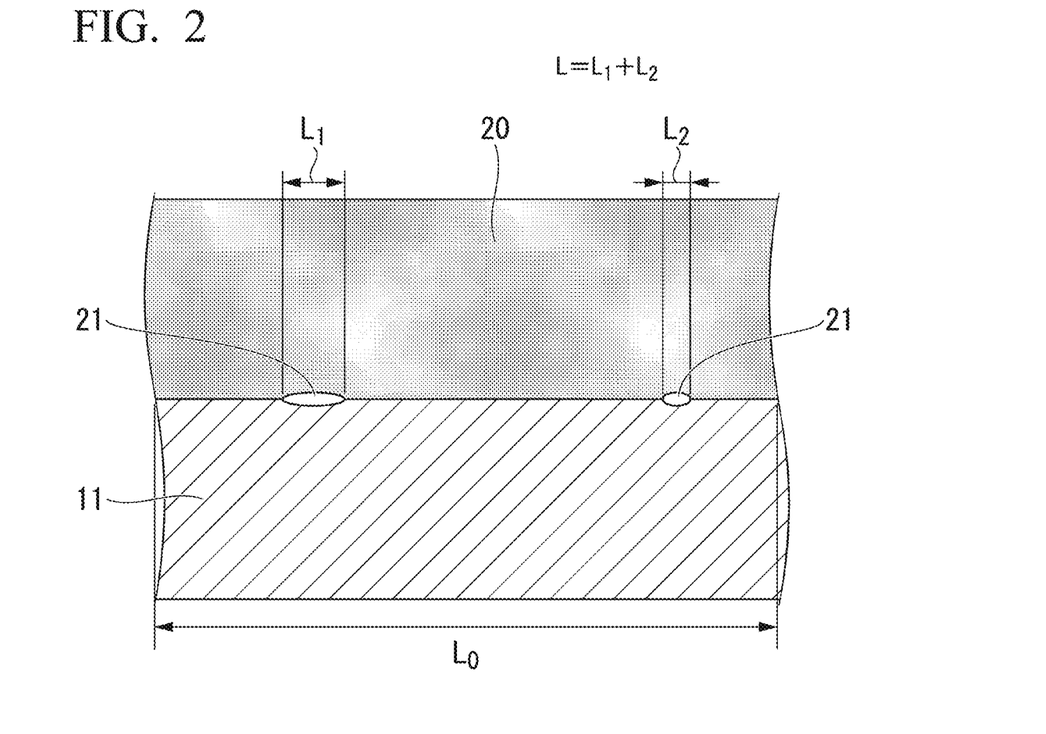
FIG. 2 is a schematic explanatory view of a bonding interface between a thermistor element and a protective film of the thermistor according to the embodiment of the present invention.

Then, in the present embodiment, as shown in FIG. 2, as a result of observing the bonding interface between the thermistor element 11 and the protective film 20, a ratio $L/L_0$ of the length L of an observed peeled portion 21 to the length $L_0$ of a bonding interface in an observation field is regulated to 0.16 or less. As shown in FIG. 2, the length L of the peeled portion 21 is the total length of the lengths L1 and L2 of the observed peeled portion 21.

In addition, the ratio $L/L_0$ of the length L of the observed peeled portion 21 to the length $L_0$ of the bonding interface in the observation field is preferably 0.16 or less, and more preferably 0.04 or less.

As will be described below, this protective film 20 is formed by precipitating silicon oxide on the surface of the thermistor element 11 by a hydrolysis reaction and polycondensation reaction of silicon alkoxide, the adhesion to the thermistor element 11 is excellent, the peeled portion 21 at the bonding interface is small, and the ratio $L/L_0$ of the length L of the observed peeled portion 21 to the length $L_0$ of the bonding interface in the observation field is 0.16 or less.

In addition, in the present embodiment, the thickness of the protective film 20 is preferably in a range of 50 nm or more and 1000 nm or less.

The lower limit of the thickness of the protective film 20 is preferably 50 nm or more, and more preferably 100 nm or more. On the other hand, the upper limit of the thickness of the protective film 20 is preferably 1000 nm or less, and more preferably 800 nm or less.

Next, a description will be given of the method for manufacturing the thermistor 10 of the present embodiment described above using the flow chart of FIG. 3.

(Thermistor Element-Forming Step S01)

Figure 3:
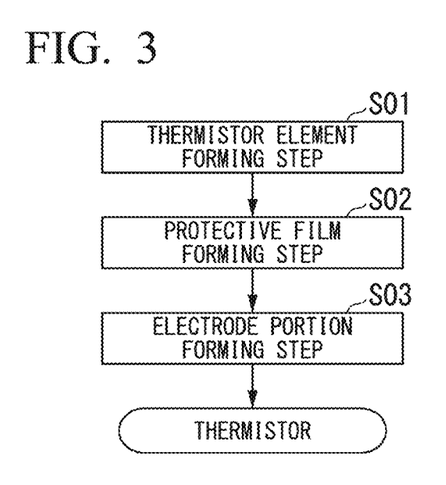
FIG. 3 is a flow chart which shows a method for manufacturing a thermistor of an embodiment of the present invention.

First, the thermistor element 11 forming a prismatic shape is manufactured. In the present embodiment, the thermistor element 11 described above is manufactured by cutting a plate material formed of a thermistor material into short strip shapes.

(Protective Film-Forming Step S02)

Next, the thermistor element 11 described above is immersed in a reaction solution including silicon alkoxide, water, an organic solvent, and an alkali, and silicon oxide ($SiO_2$) is precipitated on the surface of the thermistor element 11 by a hydrolysis reaction and polycondensation reaction of the silicon alkoxide to form the protective film 20.

Specifically, a mixed solution of water and an organic solvent is stirred, the thermistor element 11 is added to the mixed solution together with silicon alkoxide and further stirred, and an alkali is further added as a catalyst and further stirred. Subsequently, the result is immersed in a water tank, washed, and taken out. This operation is repeatedly carried out to form the protective film 20 having a predetermined film thickness. The reaction solution may be heated at the boiling point of the solvent or lower in order to improve the reaction rate.

The organic solvent may be any solvent able to dissolve water and silicon alkoxide, and alcohols having 1 to 4 carbon atoms or a mixture thereof are suitable from the viewpoint of easy availability and handling and compatibility with water.

Silicon alkoxide is a monomer having two or more alkoxy groups or an oligomer obtained by polymerizing these monomers; however, from the viewpoint of reactivity, a monomer having four alkoxy groups or an oligomer obtained by polymerizing these monomers is preferable and it is also possible to mix the above. The alkyl groups included in the silicon alkoxide may be partially or all the same. As examples of the silicon alkoxide, it is possible to use tetramethyl orthosilicate (TMOS), tetraethyl orthosilicate (TEOS), TMOS oligomers such as Methyl Silicate 51 manufactured by Tama Chemicals Co., Ltd., TEOS oligomers such as Silicate 40 manufactured by Tama Chemicals Co., Ltd., methyltrimethoxysilane, and the like.

As the alkali, it is possible to use inorganic alkalis such as ammonia, NaOH, LiOH, and KOH, and organic alkalis such as ethanolamine and ethylenediamine. In particular, from the viewpoint of adhesion of the protective film 20 on which the silicon oxide ($SiO_2$) is precipitated with respect to the thermistor element 11, it is preferable to use an inorganic alkali metal compound such as NaOH, LiOH, or KOH including an alkali metal as the alkali.

Here, for the hydrolysis and polycondensation reactions of the silicon alkoxide in the present embodiment, an alkali is the catalyst.

In a case where an alkali is used as a catalyst, negatively charged hydroxide ions attack the positively polarized silicon, one of the alkoxy groups is changed to a silanol group in a form via water, and alcohol is released. One of the alkoxy groups with a large steric hindrance is changed to a silanol group with a small steric hindrance, which makes it easier for hydroxide ions to attack, and as a result of the rapid progress of the hydrolysis reaction rate, silanol in which all the alkoxy groups are hydrolyzed is produced, the silanol is dehydrated and condensed three-dimensionally such that it is possible to make silicon oxide particles and a silicon oxide film.

Therefore, in the present embodiment, an alkali is used as a catalyst in the reaction solution and, by utilizing the hydrolysis and polycondensation reaction of silicon alkoxide using the alkali catalyst, silanol is continuously reacted with the terminal oxygen (—O) and the hydroxyl group (—OH) on the thermistor element surface as the starting point, such that it is possible to obtain the protective film 20 having high adhesion and a uniform thickness even on corners and irregularities.

In addition, in particular, in a case where an inorganic alkali metal compound such as NaOH, LiOH, or KOH including an alkali metal is used as the alkali, the alkali metal is unevenly distributed at the interface between the formed protective film 20 and the thermistor element 11. Due to the uneven distribution of the alkali metal on the interface, the generation of cracks and the like which cause peeling of the formed protective film 20 is suppressed, and the adhesion of the protective film 20 with respect to the thermistor element 11 is further increased.

(Electrode Portion-Forming Step S03)

Next, electrode portions 13 are formed at both end portions of the thermistor element 11. The protective film 20 is not formed on both end surfaces of the thermistor element 11, and the electrode portions 13 are formed so as to be in direct contact with the thermistor element 11.

In the present embodiment, an Ag paste including Ag particles is coated on both end portions of the thermistor element 11 and fired to form the electrode portions 13 formed of a fired body of Ag. In addition, a Sn plating film and/or a Ni plating film may be further formed on the fired body of Ag paste.

Here, as described above, when the Ag paste is fired, the heating is carried out, for example, to a temperature range of 700° C. or higher and 900° C. or lower, thus, the thermistor element 11 on which the protective film 20 is formed is also heated in the temperature range described above. For this reason, it is necessary for the protective film 20 to have sufficient adhesion so as to not peel off from the thermistor element 11 even in a case of being heated to the temperature described above.

Through the above steps, the thermistor 10 of the present embodiment is manufactured.

In the thermistor 10 of the present embodiment having the configuration described above, the protective film 20 formed of a silicon oxide ($SiO_2$ film in the present embodiment) is formed on the surface of the thermistor element 11, and, as a result of observing the bonding interface between the thermistor element 11 and the protective film 20, the ratio $L/L_0$ of the length L of the observed peeled portion 21 to the length $L_0$ of the bonding interface in the observation field is 0.16 or less, thus, it is possible to suppress a decrease in the adhesiveness of the protective film 20, and to suppress changes in the characteristics of the thermistor element 11 in subsequent steps.

In addition, since the protective film 20 is formed of a silicon oxide ($SiO_2$ film), the resistance to a plating solution, environmental resistance, and insulation are excellent and it is possible to suppress deterioration of the thermistor element 11.

Further, in the present embodiment, in a case where the film thickness of the protective film 20 is 50 nm or more, it is possible to reliably protect the thermistor element 11 by the protective film 20 and to reliably suppress the deterioration of the thermistor element 11.

On the other hand, in a case where the film thickness of the protective film 20 is 1000 nm or less, it is possible to suppress the occurrence of cracks or the like in the protective film 20 and to sufficiently protect the thermistor element 11.

In addition, according to the method for manufacturing a thermistor of the present embodiment, since a protective film-forming step $SO_2$ of forming the protective film 20 by immersing the thermistor element 11 in a reaction solution including silicon alkoxide, water, an organic solvent, and an alkali, and precipitating silicon oxide ($SiO_2$) on the surface of the thermistor element 11 by a hydrolysis reaction and polycondensation reaction of the silicon alkoxide, is provided, silicon oxide ($SiO_2$) is precipitated with a terminal oxygen (—O) or a hydroxyl group (—OH) on the surface of the thermistor element 11 as a starting point and the adhesion between the thermistor element 11 and the protective film 20 is excellent. In addition, since particle-form silicon oxide is precipitated according to the irregularities of the surface of the thermistor element 11, it is possible to suppress partial peeling between the thermistor element 11 and the protective film 20. Thus, it is possible to manufacture the thermistor 10 which is able to be stably used without deterioration of the characteristics.

Furthermore, in the method for manufacturing a thermistor of the present embodiment, an electrode portion-forming step S03 of forming the electrode portions 13 by coating a metal paste on both end surfaces of the thermistor element 11 and firing the metal paste, after the protective film-forming step S02, is provided, thus, it is possible to reliably suppress partial peeling between the thermistor element 11 and the protective film 20 even in a case where the metal paste is heated for firing.

In addition, in the method for manufacturing a thermistor of the present embodiment, when using an alkali metal compound such as NaOH, LiOH, or KOH including an alkali metal as the alkali included in the reaction solution, alkali metals are unevenly distributed at the interface between the formed protective film 20 and the thermistor element 11, the generation of cracks and the like which cause peeling of the formed protective film 20 is suppressed, and the adhesion of the protective film 20 with respect to the thermistor element 11 is further increased.

Although one embodiment of the present invention has been described above, the present invention is not limited thereto and appropriate changes are possible in a range not departing from the technical idea of the invention.

For example, in the present embodiment, a description has been given in which a plate material formed of a thermistor material is cut into short strip shapes to obtain a thermistor element and then the thermistor element is immersed in a reaction solution to form a protective film; however, without being limited thereto, a plate material formed of a thermistor material may be immersed in a reaction solution to form a protective film and then cut into short strip shapes to obtain a thermistor element on which a protective film is formed.

In addition, although a description has been given of the thermistor element having a prismatic shape, the present invention is not limited thereto and the thermistor element may have a cylindrical shape.

Furthermore, the structure of the electrode portion is not limited to the structure described in the present embodiment and may be another structure.

EXAMPLES

A description will be given of confirmation experiments performed to confirm the effectiveness of the present invention.

Invention Examples 1 to 4

As a base on which the protective film was formed, a thermistor element having a prismatic shape of 0.18 mm×0.18 mm×38 mm was prepared. Then, 2.0 g of water, 8 g of the organic solvent shown in Table 1, 0.25 g of silicon alkoxide, 0.2 g of alkali as a catalyst, and the thermistor element described above were added to a Laboran screw tube bottle No. 5 (volume 20 mL) and stirred and mixed. Subsequently, the mixture was heated and reacted in a water bath at 40° C. for 30 minutes. After the reaction finished, the thermistor element was taken out, washed with ion-exchanged water, and dried. This operation was repeated until the film thickness reached 500 nm. In Table 1, this film-forming method is referred to as "liquid phase method".

Next, for Invention Examples 1 and 2, the thermistor element after film formation was attached to a dicing sheet and cut to 0.365 mm, Ag paste (Himec DP4000 series manufactured by Namics Corporation) was coated on both cut end surfaces, and a base electrode was formed by firing at 750° C. In Invention Examples 3 and 4, the thermistor after film formation was attached to a dicing sheet and cut to 0.365 mm, Ag paste (ANP-1: manufactured by Nihon Superior Co., Ltd.) was coated on both cut end surfaces, the result was dried, and then a base electrode was formed by firing at 300° C. for 60 minutes in the air. Subsequently, a Ni plating film was formed by barrel plating using a sulfamic acid-based acidic plating solution and a Sn plating film was further formed thereon to manufacture a thermistor.

Comparative Examples 1 and 2

As a base on which the protective film was formed, a thermistor element having a prismatic shape of 0.18 mm×0.18 mm×38 mm was prepared.

Using a polygonal barrel sputtering device manufactured by YOUTEC, Ar gas and $O_2$ gas were introduced using a Si target and reactive sputtering was performed. The pressure was 1 Pa, the discharge power was 100 W1, the Ar flow rate was 20 sccm, the $O_2$ flow rate was 4 sccm in Comparative Example 1 and 3 sccm in Comparative Example 2, and the film formation time was 90 minutes.

The thermistor element after film formation was attached to a dicing sheet and cut to 0.365 mm, Ag paste was coated on both cut end surfaces, and a base electrode was formed by firing at 750° C. Subsequently, a Ni plating film was formed by barrel plating using a sulfamic acid-based acidic plating solution and a Sn plating film was further formed thereon to manufacture a thermistor.

(Ratio $L/L_0$ of Length L of Observed Peeled Portion and Length $L_0$ of Bonding Interface in Observation Field)

Figure 4A:
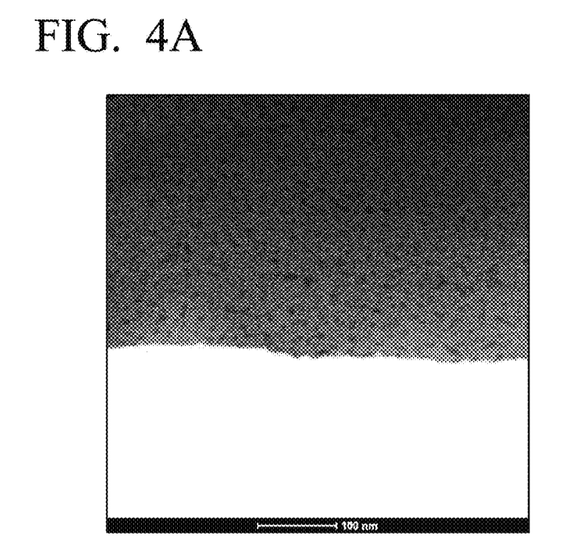
FIG. 4A is an observation photograph of a bonding interface between the thermistor element and the protective film of the thermistor of Invention Example 1 in the Examples.
Figure 4B:
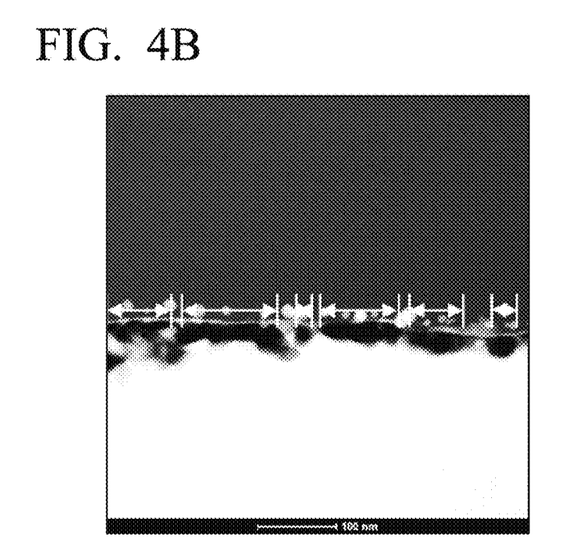
FIG. 4B is an observation photograph of a bonding interface between the thermistor element and the protective film of the thermistor of Comparative Example 2 in the Examples.

A sample for TEM observation was prepared by being sliced to a thickness of 80 to 100 nm from the surface of the thermistor by a focused ion beam processing observation device and observed with a transmission electron microscope. The observation results of Invention Example 1 are shown in FIG. 4A and the observation results of Comparative Example 2 are shown in FIG. 4B. In FIG. 4A and FIG. 4B, the dark part of the upper portion is the protective film and the white part of the lower portion is the thermistor element.

From the HAADF image observed at 160,000 times magnification with an accelerating voltage of 200 kV and a probe diameter of 0.1 nm, in a range of 500 nm or more per field, as shown in the range of the arrow shown in FIG. 4B, the lengths of the peeled portions where the thermistor element and protective film were not adhered to each other, which appear black, were totaled, and a ratio obtained by dividing by the length of the entire measurement range was calculated. The ratio $L/L_0$ of the length L of the observed peeled portion to the length $L_0$ of the bonding interface in the observation field was set as the average of a total of 5 fields at the center of each region obtained by dividing the side surface of the thermistor into 5 equal parts in the long side direction.

(Adhesion)

Using an indentation test according to the ultra-fine indentation hardness tester ENT-1100a manufactured by Elionix Inc., the maximum load was set to 1000 mgf by a linear load process in the load-unload test mode and the difference in the adhesion strength of the protective film due to the difference in film formation method was measured. As an indenter, a Berkovich-type diamond indenter with an interridge angle of approximately 115° was used and the Tanaka method was used for indenter tip correction. This correction method is a correction method in which the sum (correction length) of the cutting length (wear length) of the indenter tip and the indent depth due to the preliminary load at the time of surface detection is obtained in advance.

Figure 5A:
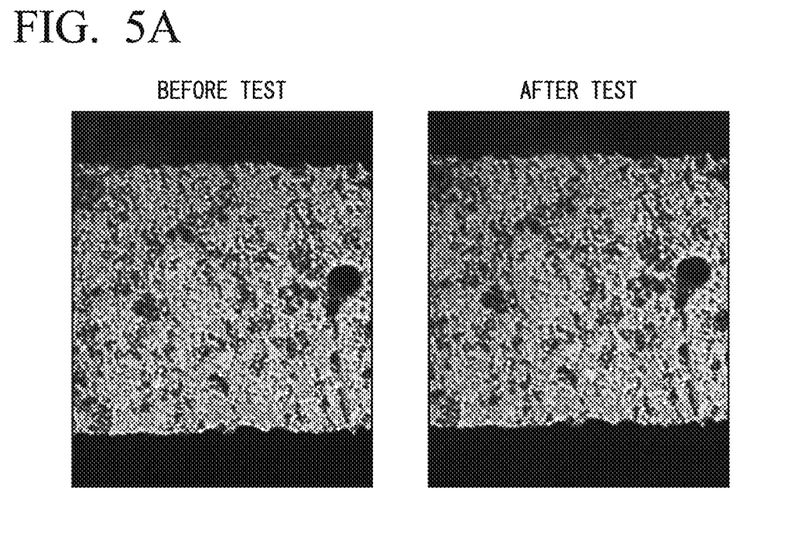
FIG. 5A is an observation photograph showing the results of an indentation test of the thermistor of Invention Example 1 in the Examples.
Figure 5B:
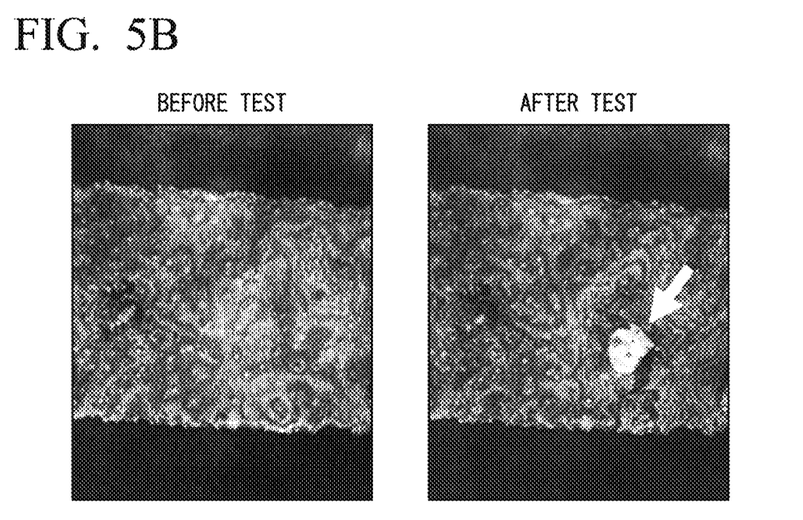
FIG. 5B is an observation photograph showing the results of an indentation test of the thermistor of Comparative Example 2 in the Examples.

For the adhesion, an indentation test was performed at three locations on the protective film of the thermistor under the conditions described above and, when observed using the optical microscope attached to an ultra-fine indentation hardness tester, a case where peeling of the protective film was not seen in the indentation test and the ratio $L/L_0$ was 0.05 or less was determined as "good", a case where peeling of the protective film was not seen in the indentation test and the ratio $L/L_0$ was 0.16 or less was determined as "acceptable", and a case where peeling was seen at one or more locations in the indentation test was determined as "unacceptable". The indentation test result of Invention Example 1 is shown in FIG. 5A and the indentation test result of Comparative Example 2 is shown in FIG. 5B.

TABLE 1

| | Film-forming method of protective film | Reaction solution | | | Length ratio $L/L_0$ of peeled portion | Adhesion Evaluation |
| --- | --- | --- | --- | --- | --- | --- |
| | | Organic solvent | Silicon alkoxide | Alkali | | |
| Invention Example 1 | Liquid phase method | Industrial alcohol *1 | Tetraethyl orthosilicate | 0.2 N NaOH | 0.00 | Good |
| Invention Example 2 | Liquid phase method | Ethanol | Tetraethyl orthosilicate | 0.4 N LiOH | 0.04 | Good |
| Invention Example 3 | Liquid phase method | Industrial alcohol *2 | Methyl Silicate 51 | 25% ammonia water | 0.07 | Acceptable |
| Invention Example 4 | Liquid phase method | Isopropyl alcohol 50%/ethanol 50% | Silicate 40 | Anhydrous ethylene diamine | 0.16 | Acceptable |

TABLE 1-continued

|  | Film-forming method of protective film | Reaction solution | | | Length ratio $L/L_0$ of peeled portion | Adhesion Evaluation |
|---|---|---|---|---|---|---|
|  |  | Organic solvent | Silicon alkoxide | Alkali | | |
| Comparative Example 1 | Sputtering method | — | — | — | 0.50 | Unacceptable |
| Comparative Example 2 | Sputtering method | — | — | — | 0.70 | Unacceptable |

*1 99% methanol-modified alcohol manufactured by Imazu Chemical Co.,Ltd.
*2 Solmix HP-1 manufactured by Japan Alcohol Corporation.

In Comparative Examples 1 and 2 in which a protective film was formed on the surface of the thermistor element by the sputtering method, the ratio $L/L_0$ of the length L of the observed peeled portion and the length $L_0$ of the bonding interface in the observation field was as large as 0.5 and 0.7, respectively. In addition, the adhesion evaluation was "unacceptable".

On the other hand, in Invention Examples 1 to 4 in which the thermistor element was immersed in a reaction solution including silicon alkoxide, water, an organic solvent and an alkali, and silicon oxide was precipitated on the surface of the thermistor element by a hydrolysis reaction and polycondensation reaction of the silicon alkoxide to form a protective film, the ratio $L/L_0$ of the length L of the observed peeled portion and the length $L_0$ of the bonding interface in the observation field was suppressed to 0.16 or less.

In addition, in Invention Example 1 using NaOH including an alkali metal as an alkali and Invention Example 2 using LiOH, the ratios $L/L_0$ were 0.00 and 0.04, respectively, which were lower than Invention Examples 3 and 4, which did not include an alkali metal, and peeling of the protective film was not seen in the indentation test, thus, the adhesion evaluation was "good".

It is considered that this is because, when the reaction solution includes an alkali metal, the alkali metal is unevenly distributed at the interface between the formed protective film and the thermistor element. When the alkali metal is unevenly distributed at the interface between the protective film and the thermistor element, the generation of cracks which cause peeling is suppressed in the protective film. Due to this, it is considered that the ratio $L/L_0$ of the length L of the observed peeled portion and the length $L_0$ of the bonding interface in the observation field becomes extremely small at 0.00 and 0.04 and the adhesion between the protective film and the thermistor element becomes high.

On the other hand, in Invention Examples 3 and 4, which did not include an alkali metal as an alkali, the alkali metal was not unevenly distributed at the interface between the protective film and the thermistor element, thus, the ratios $L/L_0$ of the length L of the observed peeled portion and the length $L_0$ of the bonding interface in the observation field were 0.07 and 0.016, respectively, which were larger than those of invention Examples 1 and 2, but peeling of the protective film was not seen in the indentation test, therefore, the adhesion evaluation was "acceptable".

As described above, according to the Invention Examples, it was confirmed that it is possible to provide a thermistor which has excellent adhesion between a thermistor element and a protective film, which is able to suppress changes in the characteristics of the thermistor element during manufacturing and use, and which is able to be stably used.

REFERENCE SIGNS LIST

10 Thermistor
11 Thermistor element
13 Electrode portion
20 Protective film

What is claimed is:

1. A thermistor, comprising:
    a thermistor element;
    a protective film formed on a surface of the thermistor element; and
    electrode portions formed on both end portions of the thermistor element,
    wherein the protective film is formed of silicon oxide, and, as a result of observing a bonding interface between the thermistor element and the protective film, a ratio $L/L_0$ of a length L of an observed peeled portion to a length $L_0$ of the bonding interface in an observation field is 0.16 or less.

2. The thermistor according to claim 1,
    wherein a film thickness of the protective film is in a range of 50 nm or more and 1000 nm or less.

3. A method for manufacturing a thermistor provided with a thermistor element, a protective film formed on a surface of the thermistor element, and electrode portions formed on both end portions of the thermistor element, the method comprising:
    a protective film-forming step of forming the protective film by immersing the thermistor element in a reaction solution including silicon alkoxide, water, an organic solvent, and an alkali, and causing a silicon oxide to precipitate on the surface of the thermistor element by a hydrolysis reaction and polycondensation reaction of the silicon alkoxide.

4. The method for manufacturing the thermistor according to claim 3, further comprising:
    an electrode portion-forming step of forming the electrode portions by coating a metal paste on both end surfaces of the thermistor element and firing the metal paste, after the protective film-forming step.

5. The method for manufacturing the thermistor according to claim 3, wherein the alkali includes an alkali metal compound.

6. The method for manufacturing the thermistor according to claim 4, wherein the alkali includes an alkali metal compound.

7. The thermistor according to claim 1,
    wherein silver is excluded from the protective film.

* * * * *